United States Patent
Huang

(10) Patent No.: US 7,576,493 B2
(45) Date of Patent: Aug. 18, 2009

(54) VEHICLE LED LAMP CONTROLLER USED IN LOW TEMPERATURE ENVIRONMENT

(75) Inventor: Jack Huang, Tucheng (TW)

(73) Assignee: Yujing Technology Ltd (TW)

( * ) Notice: Subject to any disclaimer, the term of this patent is extended or adjusted under 35 U.S.C. 154(b) by 750 days.

(21) Appl. No.: 11/375,213

(22) Filed: Mar. 15, 2006

(65) Prior Publication Data

US 2007/0222390 A1    Sep. 27, 2007

(51) Int. Cl.
*B60Q 1/02*    (2006.01)
(52) U.S. Cl. .......................................... 315/82; 362/545
(58) Field of Classification Search .................. None
See application file for complete search history.

(56) References Cited

U.S. PATENT DOCUMENTS

2005/0200287 A1 * 9/2005 Ito et al. ........................ 315/82
2005/0236999 A1 * 10/2005 Ito et al. ........................ 315/77
2006/0082332 A1 * 4/2006 Ito et al. ....................... 315/291

* cited by examiner

*Primary Examiner*—Paul Huber
(74) *Attorney, Agent, or Firm*—Hershkovitz & Associates, LLC; Abraham Hershkovitz

(57) ABSTRACT

A vehicle LED lamp controller connected between one DC power source and multiple LED elements has a starting circuit, a preheating circuit and a current limitation circuit. The starting circuit is connected to the power source through the preheating circuit and connected to the multiple LED elements. The preheating circuit provides a continuous small current to the multiple LED elements to preheat the LED elements when the preheating circuit detects the temperature environment is low. The current limitation circuit is connected between the DC power source and multiple LED elements to automatically connect or disconnect a connection between the multiple LED elements and the DC power source according to changes of current supplied to the multiple LED elements. Therefore, the present invention provides a safety circuit loop.

8 Claims, 4 Drawing Sheets

VEHICLE LED LAMP CONTROLLER USED IN LOW TEMPERATURE ENVIRONMENT

BACKGROUND OF THE INVENTION

1. Field of the Invention

The present invention relates to a vehicle LED lamp controller and more particularly to a vehicle LED lamp controller providing a safety circuit and used in low temperature environment.

2. Description of Related Art

An LED element has low power consumption and long life term etc. features. Since the white LED element is successfully developed and the LED element, such as red or yellow color LED, has fifty thousand to one hundred thousand-hour life term, the LED elements are wildly used as the light source of the vehicle lamp, recently. However, the brightness of one LED element is not large enough to be a light source of a vehicle lamp. Therefore, the vehicle LED lamp requires multiple LED elements to comply with the standard value of brightness of related vehicle regulation.

To make sure the vehicle LED lamp keeps to work when one or few LED elements are broken, there are three common driving circuits shown in FIGS. 4A to 4C. With first reference to FIG. 4A, the multiple LED elements (LED) are connected in parallel and further connected to one DC power source (+12V). When the DC power source (+12V) is supplied to the multiple LED elements (LED), the vehicle LED lamp will be driven to emit light. If one or few LED elements are broken, other LED elements are still lighted.

With further reference to FIG. 4B, another driving circuit has multiple strings of the LED elements (LED). The strings of the LED elements (LED) are further connected to each other in parallel. The strings of the LED elements (LED) are connected to one DC power source (+12V). When the DC power source (+12V) is supplied to the strings of the LED elements (LED), all strings of the LED elements (LED) emits light. However, if one or few strings of the LED elements (LED) are broken, other strings of the LED elements will emit right.

With reference to FIG. 4C, another conventional driving circuit has multiple LED elements (LED) connected to each other in matrix. Therefore, when one or few LED elements are broken, other LED elements are still bright.

The forgoing three driving circuits respectively ensure that the vehicle LED lamp keeps to light when one or more LED elements are broken, but the brightness of the vehicle LED lamp is decreased. Therefore, these driving circuits are not good enough. In addition, since the operation temperature of the LED element has to be controlled in a specific temperature range to keep work normally, the LED elements are not worked normally when they are used in low temperature environment. Therefore, the vehicle LED lamp is not used wildly in any place of this globe.

Therefore, the present invention provides a controller for a vehicle LED lamp to overcome the drawbacks of the conventional driving circuit of the LED lamp.

SUMMARY OF THE INVENTION

The main objective of the present invention is to provide a vehicle LED lamp controller that provides a safety circuit loop and ensures that the vehicle LED lamp works normally in low temperature environment.

A vehicle LED lamp controller connected between one DC power source and multiple LED elements has a starting circuit, a preheating circuit and a current limitation circuit. The starting circuit is connected to the power source through the preheating circuit and connected to the multiple LED elements. The preheating circuit can provide a continuous small current to the multiple LED elements when the preheating circuit detects the temperature environment is low. The current limitation circuit is connected between the DC power source and multiple LED elements to automatically connect or disconnect a connection between the multiple LED elements and the DC power source according to changes of current supplied to the multiple LED elements.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
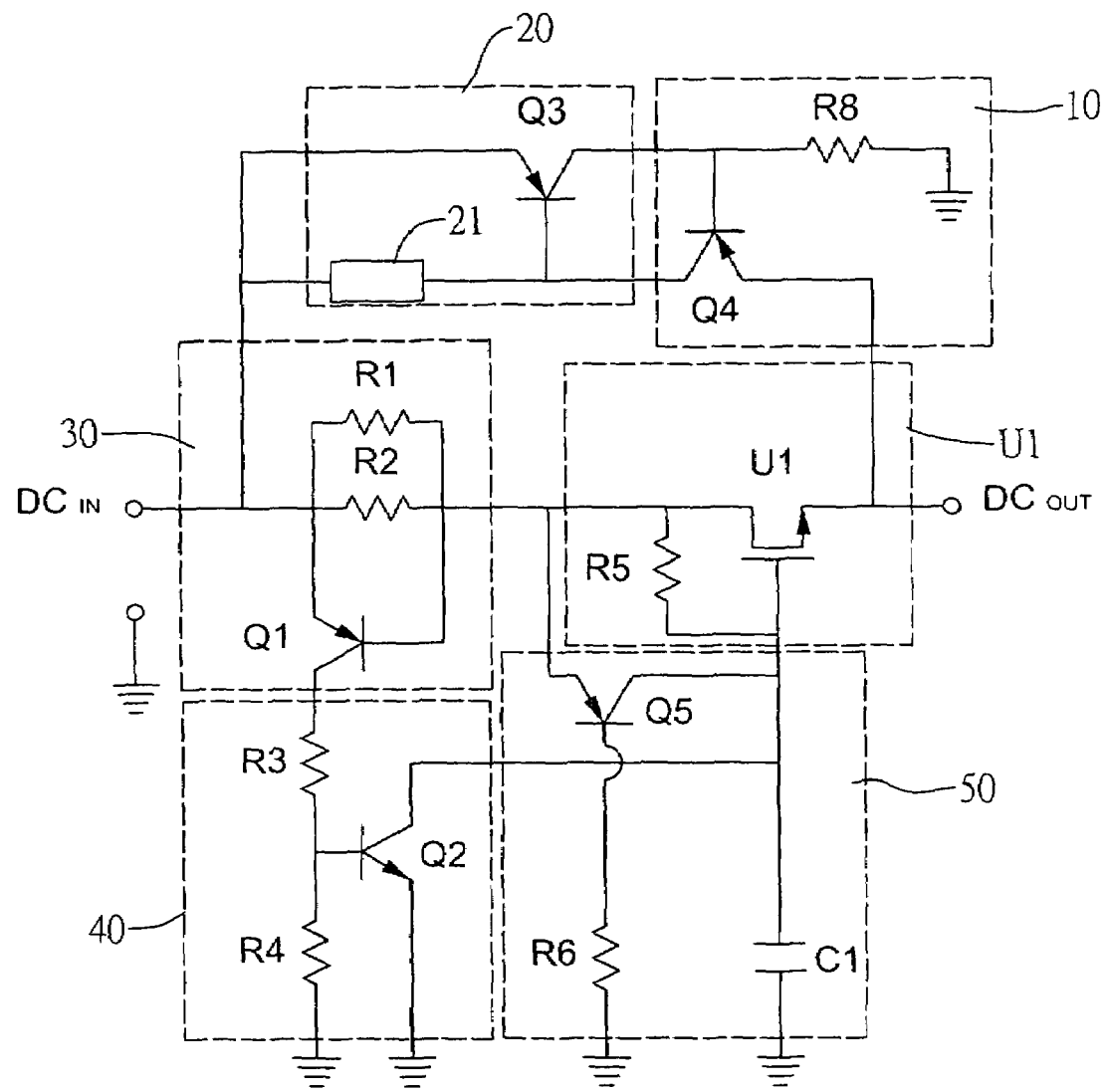
FIG. 1 is a circuit diagram of a vehicle LED lamp controller in accordance with the present invention.

A controller of vehicle LED lamp in accordance with present invention is used to connect between a DC power source ($DC_{IN}$) and multiple LED elements (not shown) to drive the LED elements. With reference to FIG. 1, the controller has a starting circuit (10), a preheating circuit (20) and a current limitation circuit.

The starting circuit (10) has an input and an output ($DC_{OUT}$). The output is connected to multiple LED elements. The starting circuit (10) may comprise a PNP transistor (Q4) and a resistor (R8). The PNP transistor (Q4) has a base terminal, an emitter terminal, and a collector terminal. The base terminal is connected to the ground through the resistor (R8), the emitter terminal is connected to the output ($DC_{OUT}$), and the collector terminal is connected to the input.

The preheating circuit (20) has an input and an output. The input is connected to the DC power source ($DC_{IN}$) and the output ($DC_{OUT}$) is connected to the input of the starting circuit (10). The preheating circuit (20) may comprise a PNP transistor (Q3) and a temperature sensor (21). The PNP transistor (Q3) has a base terminal, an emitter terminal and a collector terminal. The base terminal is connected to the input of the starting circuit (Q3). The emitter terminal is connected to the DC power source ($DC_{IN}$). The collector terminal is connected to the base terminal of the PNP transistor (Q4) of the starting circuit (10). The temperature sensor (21) is connected between the base and emitter terminals of the PNP transistor (Q3). When environment temperature is low, the temperature sensor (21) provides a bias voltage between the emitter and the base terminals to make the PNP transistor (Q3) to be conduct. During conduction period of the PNP transistor (Q3), a small current will be supplied to the multiple LED elements. Since the small current is supplied to the multiple LED elements, the LED elements can be preheated, but they do not emit light under the vehicle LED lamp in the turned off status. The temperature sensor (21) may be an NTC or PTC thermistor, or the like.

The current limitation circuit is connected between the DC power source ($DC_{IN}$) and the multiple LED elements to automatically connect or disconnect a connection between the multiple LED elements and the DC power source ($DC_{IN}$), when a present current supplied to multiple LED elements is lower than a preset current value. Therefore, the current limitation circuit prevents that the multiple LED elements are driven by low current and output low brightness light. The current limitation circuit has an electronic switch (U1), a current detector (30), a comparator (40) and a switch driver (50).

The electronic switch (U1) is connected to the multiple LED elements to decide whether the current of the DC power source is supplied to the multiple LED elements. The electronic switch (U1) may be an N-channel FET transistor having a gate terminal, a drain terminal and a source terminal. The drain terminal is connected to the multiple LED elements.

The current detector (30) is connected between the electronic switch (U1) and the DC power source ($DC_{IN}$) to detect the current supplied to the multiple LED elements through the electronic switch (U1). The current detector (30) has a PNP transistor (Q1) and two parallel resistors (R1, R2). The PNP transistor (Q1) has a base terminal, an emitter terminal and a collector terminal. The two parallel resistors (R1, R2) are connected between the base and emitter terminals. The base terminal is further connected to the source terminal of the N-channel FET transistor. The emitter terminal is further connected to the DC power source ($DC_{IN}$).

The switch driver (50) is connected to the DC power source ($DC_{IN}$) through the current detector (30) and connected to the electronic switch (U1) to keep the electronic switch (U1) in a conducting condition when the current of the DC power source is normally supplied to the multiple LED elements. The switch driver (U1) has a PNP transistor (Q5) having a base, emitter and collector terminals, and a capacitor (C1). The base terminal is connected to the ground, the collector terminal is connected to the gate terminal of the N-channel FET transistor of the electronic switch (U1) and the emitter terminal is connected to the source terminal of the N-channel FET transistor. The capacitor (C1) is connected among the collector terminal of the PNP transistor (Q5), the gate terminal of the N-channel FET transistor, and the ground. When the current of the DC power source is normal, the capacitor (C1) is charged by the conductive PNP transistor (Q5) and then provide one bias voltage to the gate terminal of the N-channel FET transistor. The N-channel FET transistor keeps in conducting conduction and provides a continuous current to the multiple LED elements.

The comparator (40) is connected to the current detector (30) and switch driver (50) to determine whether the current supplied to the multiple LED elements is lower than the preset current value. If so, the comparator (30) controls the electronic switch to (U1) be in nonconducting condition through the switch driver (50). The comparator (30) has a NPN transistor (Q2) and a bias voltage circuit (R3, R4). The NPN transistor (Q2) has a base, an emitter and a collector terminals. The bias voltage circuit (R3, R4) is connected to the collector terminal of the PNP transistor (Q1) of the current detector (30) and the base terminal of the NPN transistor (Q2). The collector terminal of the NPN transistor (Q2) is connected to the capacitor (C1) of the switch driver (40).

If some of the LED elements are broken and the broken LED elements do not decrease obviously brightness of the vehicle LED lamp, the comparator (40) will not work. On the contrary, if numbers of LED elements are broken and the brightness of the vehicle LED lamp is decreased obviously, the current supplied to the multiple LED elements is decreased wildly. The bias voltage circuit (R3, R4) of the comparator (40) obtains a bias voltage to the NPN transistor (Q2) of the comparator (40). The NPN transistor (Q2) is driven to be conduct condition and then the capacitor (C1) is discharged through the conductive NPN transistor (Q2). At the same time, the gate terminal of the N-channel FET transistor is connected to the ground and then the N-channel FET transistor is nonconductive. Therefore, the current is not supplied to the multiple LED elements and then the LED elements are automatically turned off.

Figure 2:
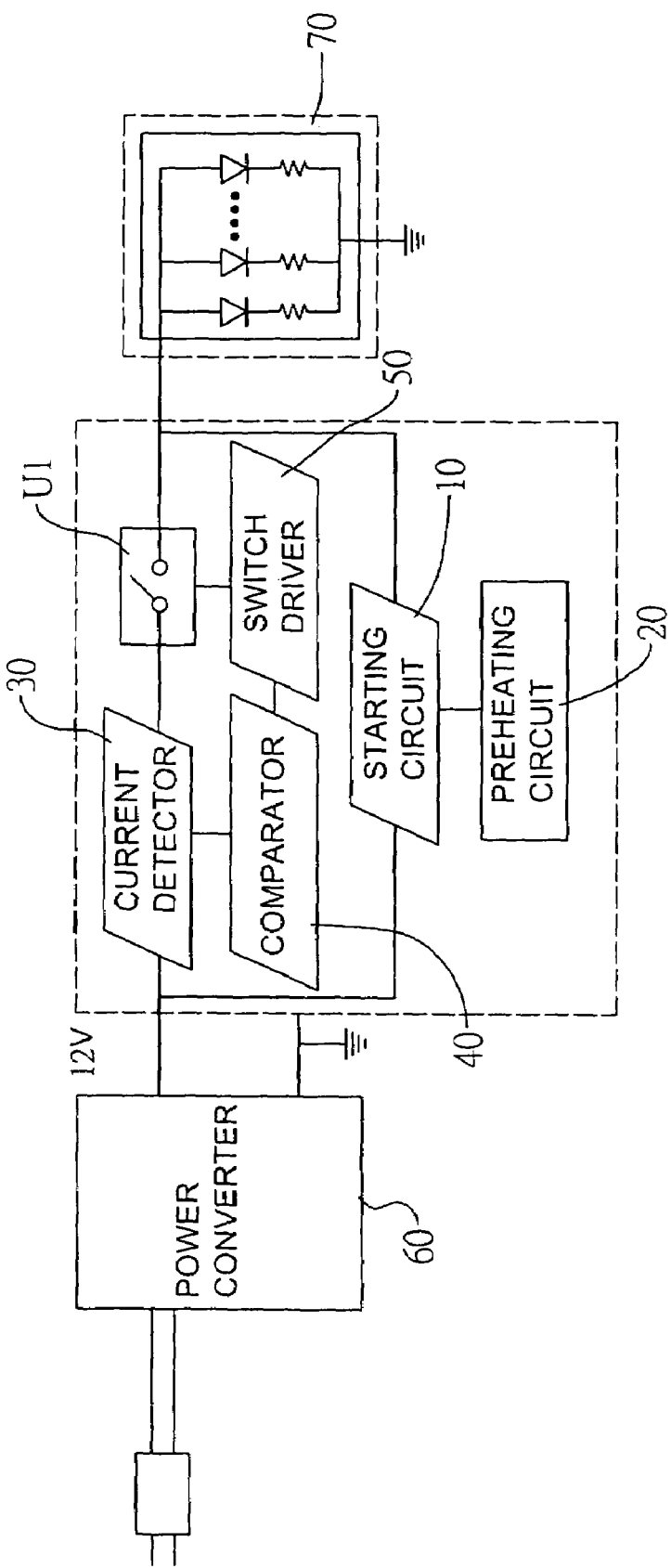
FIG. 2 is a functional block diagram of a vehicle LED lamp controller in accordance with the present invention.
Figure 3:
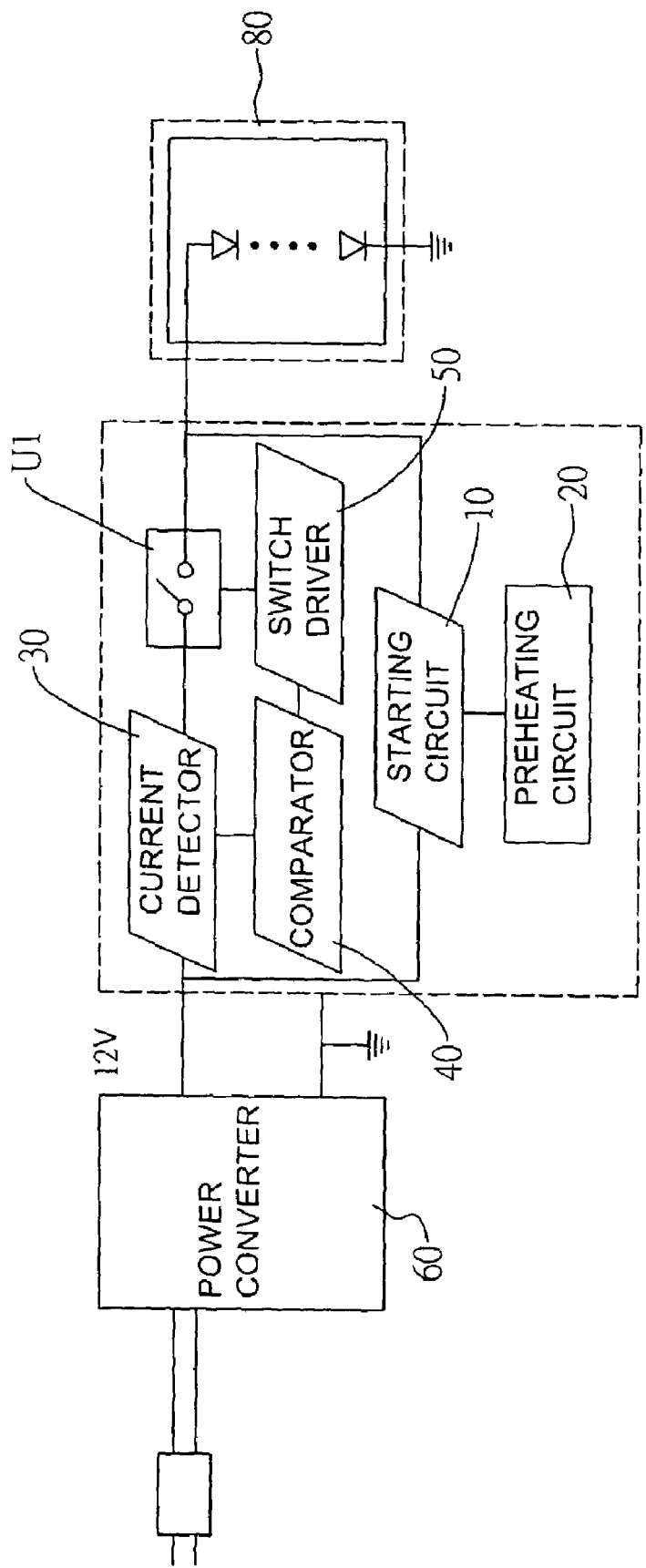
FIG. 3 is a functional block diagram of a vehicle LED lamp controller in accordance with the present invention.
Figure 4A:
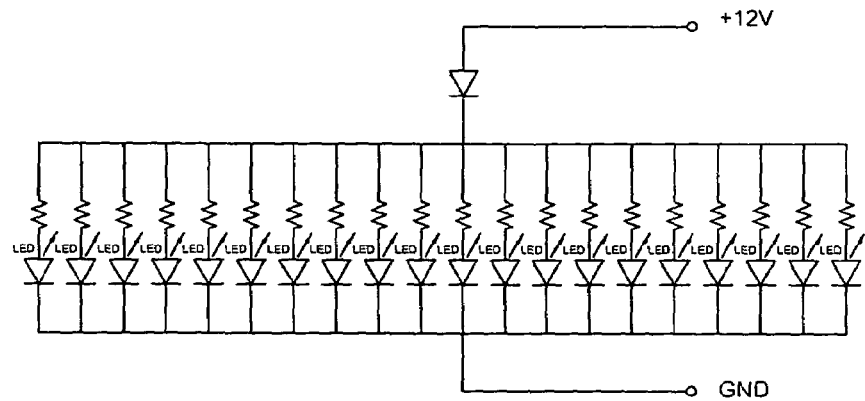
FIGS. 4A to 4C are three conventional driving circuits of a vehicle LED lamp controller in accordance with the prior art.
Figures 4B, 4C:
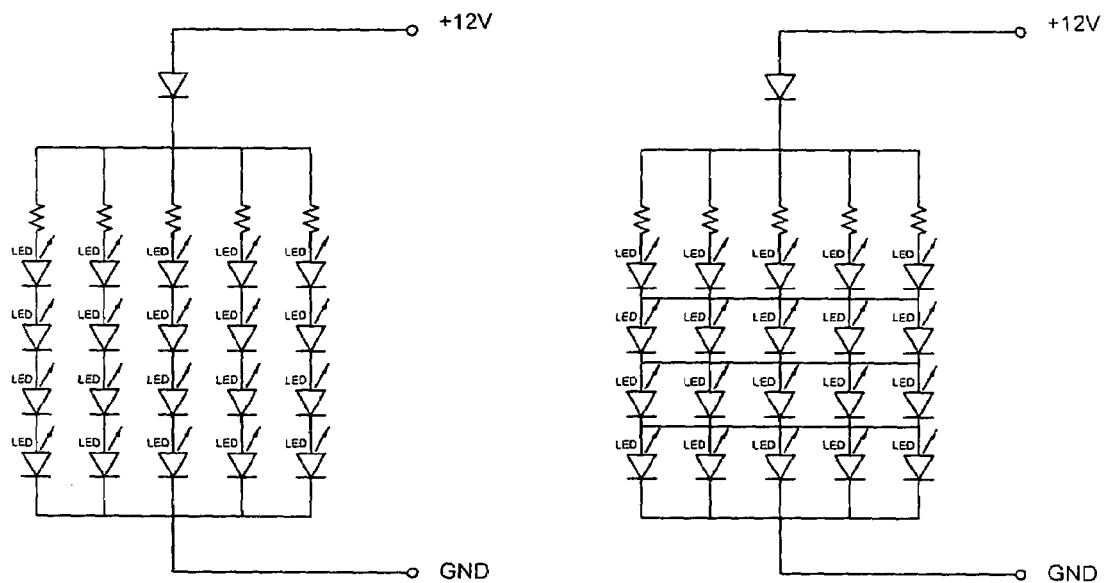

The controller of vehicle LED lamp can be used in different lamp products, such as headlamp, taillight, turning signal, emergency lamp etc. With reference to FIG. 2, the controller is used to a turning light having multiple parallel LED elements (70) and a power converter (60) output DC power source (+12V). The controller is connected between the multiple parallel LED elements and the power converter (60). With further reference to FIG. 3, the controller is used to a headlamp or emergency lamp having at least one strip of multiple LED elements (80) and one power converter (60). The controller is connected between the at least one strip of multiple LED elements and the power converter.

Based on the forgoing description, the controller of a vehicle LED lamp is connected between the DC power source and the multiple LED elements and mainly has the preheating circuit and the current limitation circuit. The preheating circuit can provide the multiple LED elements a small current to keep the multiple LED elements in a preheat condition. Therefore, the vehicle LED lamp can be used in low temperature condition. The current limitation circuit can detect the changes of current supplied to the multiple LED elements and then automatically turns off the multiple LED elements when the current is decreased obviously. Therefore, the controller of the present invention ensures that the brightness of the vehicle LED Lamp is not lower than the standard value of the related vehicle regulation.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A vehicle LED lamp controller, comprising:
   a DC power source;
   multiple LED elements;
   a starting circuit having an input and an output connected to multiple LED elements;
   a preheating circuit having an input connected to the DC power source and an output connected to the input of the starting circuit; and
   a current limitation circuit connected between the DC power source and the multiple LED elements, wherein the current limitation circuit automatically connects or disconnects a connection between the multiple LED elements and the DC power source according to changes of current supplied to the multiple LED elements, wherein the current limitation circuit comprises:
   an electronic switch connected to the multiple LED elements to decide whether the current of the DC power source is supplied to the multiple LED elements;
   a current detector connected between the electronic switch and the DC power source to detect the current supplied to the multiple LED elements through the electronic switch;

a switch driver connected to the DC power source through the current detector and connected to the electronic switch to keep the electronic switch in a conducting condition when the current of the DC power source is normally supplied to the multiple LED elements; and a comparator connected to the current detector and the switch driver to control whether the electronic switch is conductive through the switch driver, according to the changes of current supplied to the multiple LED elements.

2. The controller as claimed in claim 1, wherein the electronic switch is an N-channel FET transistor having a gate terminal, a drain terminal and a source terminal, wherein the drain terminal is connected to the multiple LED elements.

3. The controller as claimed in claim 2, wherein the current detector comprises:

a PNP transistor having a base terminal, an emitter terminal and a collector terminal, wherein the base terminal is connected to the source terminal of the N-channel FET transistor and the emitter is connected to the DC power source; and two parallel resistors connected between the base and emitter terminals of the PNP transistor.

4. The controller as claimed in claim 2, wherein the switch driver comprises:

a PNP transistor having a base terminal, emitter terminal and collector terminal, wherein the base terminal is connected to a ground, the collector terminal is connected to the gate terminal of the N-channel FET transistor of the electronic switch and the emitter terminal is connected to the source terminal of the N-channel FET transistor of the electronic switch; and a capacitor connected among the collector terminal of the PNP transistor of the switch driver, the gate terminal of the N-channel FET transistor of the electronic switch and the ground.

5. The controller as claimed in claim 4, wherein the comparator comprises:

an NPN transistor having a base, emitter and collector terminals, wherein the collector terminal of the NPN transistor is connected to the capacitor of the switch driver; and a bias voltage circuit connected to the collector terminal of PNP transistor of the current detector and the base terminal of the NPN transistor.

6. The controller as claimed in one of claims 1 to 5, wherein the starting circuit comprises a PNP transistor and a resistor, wherein the PNP transistor has:

a base terminal is connected to the ground through the resistor;

an emitter terminal is connected to the output of the starting circuit; and a collector terminal is connected to the input of the starting circuit.

7. The controller as claimed in one of claims 2 to 5, wherein the preheating circuit comprises:

a PNP transistor having a base terminal is connected to the input of the starting circuit;

an emitter terminal is connected to the DC power source; and a collector terminal is connected to the base terminal of the PNP transistor of the starting circuit; and a temperature sensor connected between the base and emitter terminals of the PNP transistor.

8. The controller as claimed in claim 6, wherein the preheating circuit comprises:

a PNP transistor having a base terminal is connected to the input of the starting circuit;

an emitter terminal is connected to the DC power source; and a collector terminal is connected to the base terminal of the starting circuit; and a temperature sensor connected between the base and emitter terminals.

* * * * *